United States Patent [19] [11] Patent Number: 5,044,785
Bair et al. [45] Date of Patent: Sep. 3, 1991

[54] BEARING ISOLATOR

[75] Inventors: John J. Bair, Union Lake, Mich.;
Edward J. Bantz, Grafton, Wis.;
Gerald D. Damon, Farmington, Mich.

[73] Assignee: Eaton Corporation, Cleveland, Ohio

[21] Appl. No.: 539,118

[22] Filed: Jun. 18, 1990

[51] Int. Cl.⁵ .............................................. F16C 27/06
[52] U.S. Cl. .................................... 384/536; 384/582
[58] Field of Search ............... 384/535, 536, 581, 582, 384/571

[56] References Cited

U.S. PATENT DOCUMENTS

| | | | |
|---|---|---|---|
| 3,050,352 | 8/1962 | Moxley | 384/536 |
| 3,385,543 | 5/1968 | Jäkel et al. | 384/582 |
| 3,447,846 | 6/1969 | Marsh | 384/536 |
| 3,704,922 | 12/1972 | Kleinschmidt et al. | 384/582 |
| 3,743,365 | 7/1973 | Kato | 384/536 |
| 3,885,840 | 5/1975 | Neder | 384/536 |
| 4,229,055 | 10/1980 | Olschewski et al. | 384/536 |

Primary Examiner—Thomas R. Hannon
Attorney, Agent, or Firm—R. A. Johnston

[57] ABSTRACT

An integrally formed annular plastic bearing isolator for ball and tapered roller bearings journalling power transmission shafts. The isolator has a plurality of circumferentially spaced energy absorbing pads extending radially from the inner periphery thereof. The inner surface of the energy absorbing pads are at least an interference fit with the outer bearing race and have a predetermined radial spring rate for absorbing bearing movement. A plurality of circumferentially spaced stop pads alternate with the energy absorbing pads and are spaced radially from the outer race to permit limited radial compression of the energy absorbing pads. For tapered roller bearings a plurality of radially inwardly extending circumferentially spaced tabs each having axially extending pads thereon are provided for absorbing axial movement of the outer race.

20 Claims, 3 Drawing Sheets

BEARING ISOLATOR

The present invention relates to the installation of bearings in housings or casings for power transmission shafts and particularly to ball and roller bearings employed in transmissions for the vehicular drive trains. In heavy duty on-and-off highway vehicles where substantial torque is transmitted through power transmissions as for example gearboxes, problems have been encountered in providing quiet operation, and, it has been desired to reduce the gear noise transmitted from gear shafts through the journals to the housing or gear casing.

In typical heavy duty power transmissions employed for vehicular use, the bearings employed for journalling the various shafts in the transmission have the outer race of the bearing registered directly against the gear casing which is commonly formed of metal such as cast iron, steel or aluminum. Thus, vibrations brought about by the high torque meshing of gear teeth are transmitted from the shafts and the bearing races to the casing or housing providing, in some cases, resonance of the housing and an amplification of the noise.

In order to provide for quieter operation of heavy duty power transmissions employing gears, it has thus been desired to find a way or means of isolating the bearing journals from the gear casing or housing to provide dampening of the gear noise and prevent transmission of the gear noise or vibration to the housing.

SUMMARY OF THE INVENTION

The present invention provides a unique and novel isolator for bearings, and particularly ball and roller bearings. The invention particularly relates to such bearings as are employed for journalling power transmission shafts in a rigid housing such as the journalling of shafts onto the housing or casing of a heavy duty vehicle gearbox. The bearing isolator of the present invention provides for dampening of gear noise transmitted through the shaft and comprises an annular plastic preferably unitary member received over the outer race of the bearing and intermediate the outer race and the housing. Energy absorbing means comprising pad portions thereof are in interference contact with the outer bearing race. Stop means comprising a plurality of integral stop pads are provided about the inner periphery of the isolator and spaced radially a predetermined incremental radial distance from the outer periphery of the outer bearing race. The energy absorbing portions or pads in direct contact with the outer surface of the outer bearing race are resiliently deflected, and absorb vibration and movement of the shaft by radial compression; and, the compression or motion thereof is limited by contact with the stop means. Annular radially extending flange means is provided with an axial face for registration against the casing or housing means to maintain the isolator in the desired axial position.

In applications for bearings designed to absorb only radial loads, such as ball bearings and straight roller or needle bearings, the isolator has a radially inwardly extending flange means in the form of a plurality of tabs for registration against one axial face of the outer bearing race. A radially extending flange means is provided in the form of a radially outwardly extending annular flange which registers against the gear casing or housing for maintaining the isolator in the desired position.

In tapered roller bearing applications, the isolator employs, in addition to the energy absorbing means and the stop means about the inner periphery thereof, a radially inwardly extending flange means comprising a plurality of tabs spaced about the inner periphery. Each of the tabs has an axially extending pad means provided thereon for registration against an axial force of the outer bearing race, which axial pad means absorb axial bearing loads by compression thereof in an axial direction against the bearing support structure.

It is an object of the present invention to provide a one-piece plastic bearing isolator having integral energy absorbing means defining a circumference of a preselected diameter for providing desired attenuation of radial movement of a bearing disposed therein and to provide limit stop means disposed an incremental radial distance from said preselected diameter.

It is thus an object of the present invention to provide a one-piece bearing isolator having integrally formed thereon compressible energy absorbing means for dampening radial movement of the bearing and integral stop means for limiting the radial movement as damped.

It is an additional object of the present invention to provide a unique and novel one-piece plastic bearing isolator having integral portions thereof with predetermined compressibility comprising a plurality of pads to absorb radial movement of the outer bearing race with respect to the casing or housing and other integral portions thereof comprising a plurality of limit stop pads for limiting the energy absorbing radial movement thereof.

It is another object of the present invention to provide, in addition to providing a bearing isolator not only capable of absorbing radial vibration and movement of the outer bearing race, but also a bearing isolator capable of absorbing axial thrust and vibration of a bearing subjected to thrust loads thereon.

DETAILED DESCRIPTION

Figure 1:
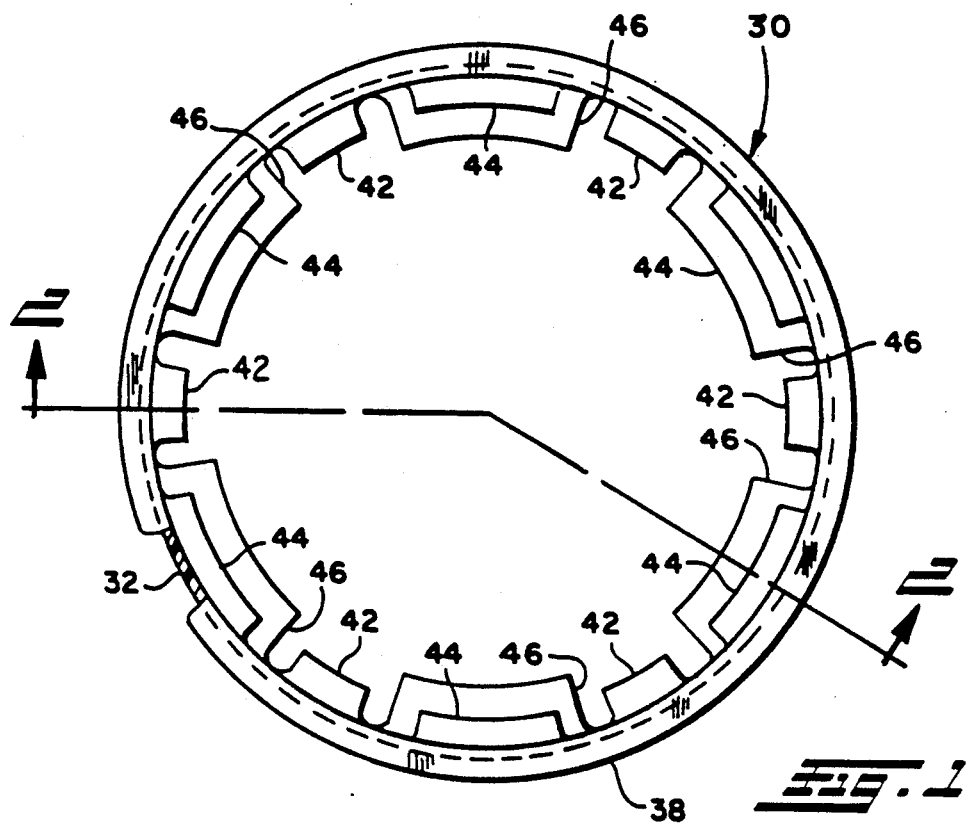
FIG. 1 is a plan view of a bearing isolator of the present invention for isolating a ball bearing.
Figure 2:
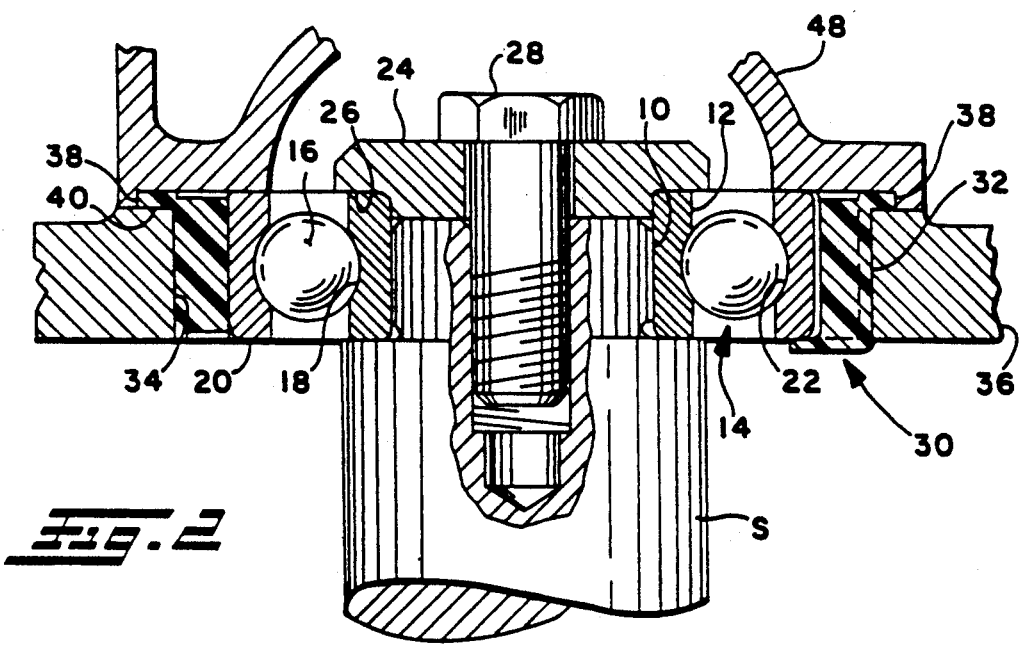
FIG. 2 is a section view taking a long section indicating lines 2—2 of FIG. 1 and shows a typical installation of the isolator of FIG. 1.

Referring to FIGS. 1 and 2, a power transmission shaft which may be driven by meshed gears (not shown) is denoted by the reference character S and has a reduced diameter 10 provided thereon. The inner periphery of an inner bearing race 12 of a ball bearing assembly indicated generally at 14, which has a plurality of roller or ball bearing members 16 disposed in an annular channel 18 provided in the outer periphery of race 12. Although ball bearings are illustrated, it will be understood that straight roller or needle bearings (not shown) may also be utilized with the present invention. The bearing assembly 14 has an outer race comprising annular member 20 which has the ball bearing member 16 disposed in an annular channel 22 formed in the inner periphery thereof. The bearing assembly 14 is retained on shaft S by a retaining member or cap 24 having an axial surface 26 thereof registered against the outer axial face of the inner bearing race 12. The member 24 is secured to the end of shaft S by a suitable expedient such as cap screw 28 threaded into the end of shaft S.

A bearing isolator indicated generally at 30 comprises a preferably unitary annular member having the outer periphery 32 thereof received in closely fitting engagement with the inner surface of an aperture 34 provided in the gear housing or casing 36. Member 30 has radially outwardly extending flange 38 extending from the outer periphery 32; and, flange 38 has an axial face 40 thereof registered against the outer surface of the gear casing 36.

Figure 3:
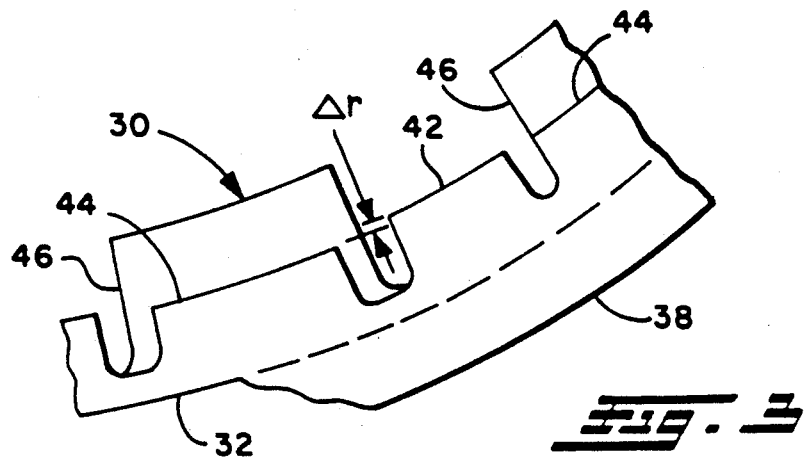
FIG. 3 is a view showing an enlarged portion of the isolator of FIG. 1.

Isolator 30 has disposed about the inner periphery thereof energy absorbing means comprising in the preferred practice of the invention a plurality of circumferentially preferably equally spaced energy absorbing pads denoted by reference numeral 42 in FIGS. 1 and 3 which extend radially inwardly. In the presently preferred practice of the invention, the pads 42 have the radially inner surface thereof formed to provide a diameter sized for at least a line-to-line interference fit with the outer periphery of outer bearing race 20 such that relative radial movement or lost motion therebetween is prohibited. The circumferential width and axial width of each of the pads 42 is chosen, for any plastic material of a given modulus in compression, to provide a desired compressibility for each of the pads 42 in the radial direction. In the presently preferred practice, the pads 42 are each sized and configured to have a compressibility in the radial direction, or radial spring rate in compression of 0.5-2 million pounds per inch $(4.3 \times 17.3 \times 10^5$ kilograms per centimeter). In the presently preferred practice, the bearing isolator 30 is formed of a plastic material having a modulus of compression of at least 200 and preferably 200–1000 KPSI $(13.8-69.0 \times 10^5 KPa)$. A material with a strength to modulus ratio of between 0.05 and 0.2 is appropriate, the higher the better. Plastic material having a polyamide-imide composition has been found particularly satisfactory in the present practice.

The annular member 30 also has stop means provided about the inner periphery thereof for limiting the radial movement of the shaft as it compresses any of pads 42. The stop means comprises, in the presently preferred practice, a plurality of stop pads 44 disposed in circumferentially spaced arrangement and extending radially inwardly from the inner periphery of member 30. In a present practice of the invention the stop pads 44 are disposed circumferentially intermediate adjacent ones of the energy absorbing pads 42, or, in other words, in alternating arrangement with the pads 42. The stop pads 44 each extend circumferentially about the inner periphery of the member 30 by a substantially greater distance than the energy absorbing pads 42 so as to provide substantially rigid stop pads in the radial direction. The stop pads, although formed of the same material as pads 42, have a radial spring rate at least an order of magnitude greater than the energy absorbing pads 42.

With particular reference to FIG. 3, each of the stop pads 44 has the radially inner surface thereof spaced outwardly by an amount $\Delta r$ from the outer bearing race 20 or the inner surface of the energy absorbing pads 42 as denoted in FIG. 3. In operation, vibration or radial movement of the outer bearing race 20 against the energy absorbing pads 42 causes radial compression of the pads 42 by an amount of only $\Delta r$ at the controlled spring rate of the energy absorbing pads 42, whereupon, the outer surface of the bearing race 20 makes contact with the inner periphery of the stop pads 44 thereby limiting any significant further movement of the bearing races 20 in the radial direction.

Referring to FIGS. 1, 2, and 3, the annular member 30 has an inwardly extending flange means comprising in the present practice a plurality of tabs 46 which extend from the axially inner edge of the isolator 30 with respect to the casing 36.

Each of the tabs 46 is generally circumferentially coincident with one of the stop pads 44 and preferably extends circumferentially a greater distance. The tabs 46 are registered against the inner axial face of the outer bearing race 20. The bearing isolator 30 and the outer race of the bearing 20 are maintained in position by a suitable retaining cap 48 secured to the housing 36.

In the present practice of the invention, the energy absorbing pads are sized by assuming a number of pads, preferably six, and, that when the maximum radial load is centered on one of the pads 42, with the adjacent pads each sharing a portion proportional to the cosine of the included angle (e.g. 60 degrees) between the center of the adjacent pad and the centered pad, such that the maximum allowable compressive stress in any pad is on the order of 5000 lb./in$^2$ $(2.9 \times 10^4 KPa)$ and limited thereby to bump stop pad.

It will be understood that the maximum allowable radial compressive reaction load is developed by compression of any one of the pads 42 by the amount of deflection denoted $\Delta r$ in FIG. 3, which in the presently preferred practice is limited to about 0.005 inches (0.12 millimeters).

Figure 4:
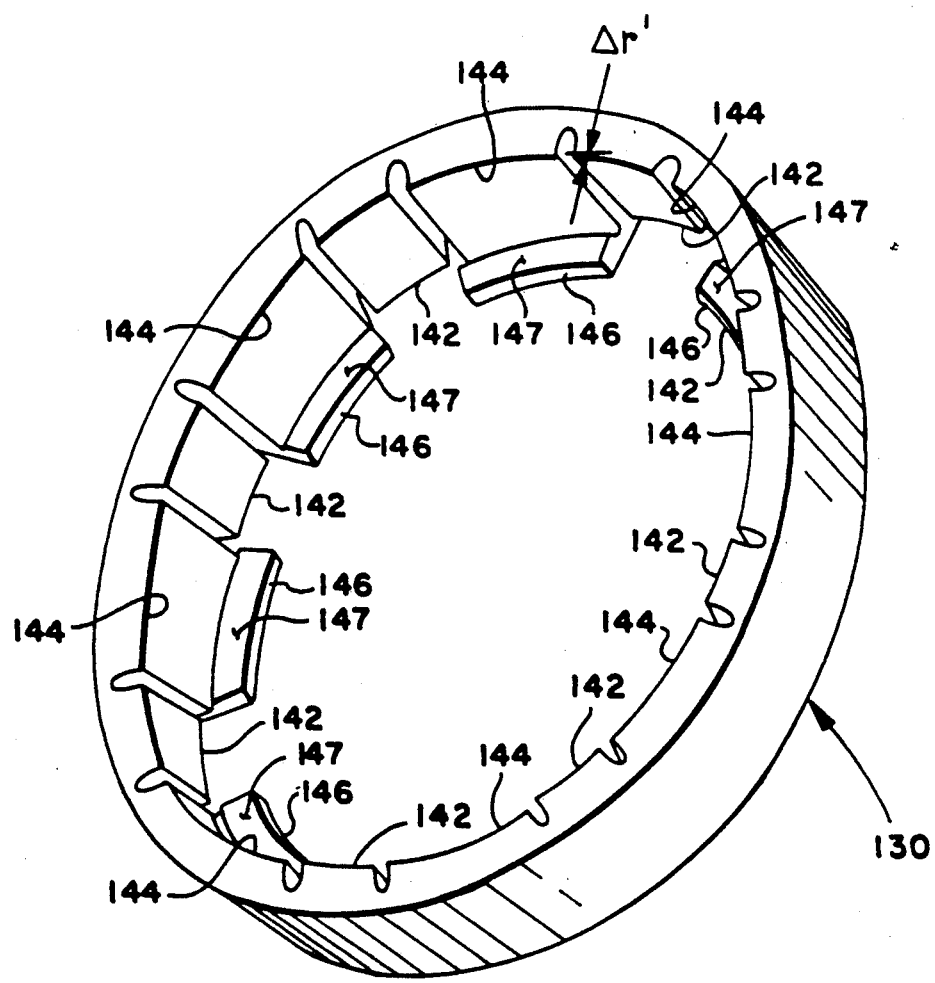
FIG. 4 is a somewhat perspective view of another embodiment of the invention suitable for use with tapered roller bearings; and, FIG. 5 is a cross-sectional view of the FIG. 4 embodiment as installed in a bearing installation.
Figure 5:
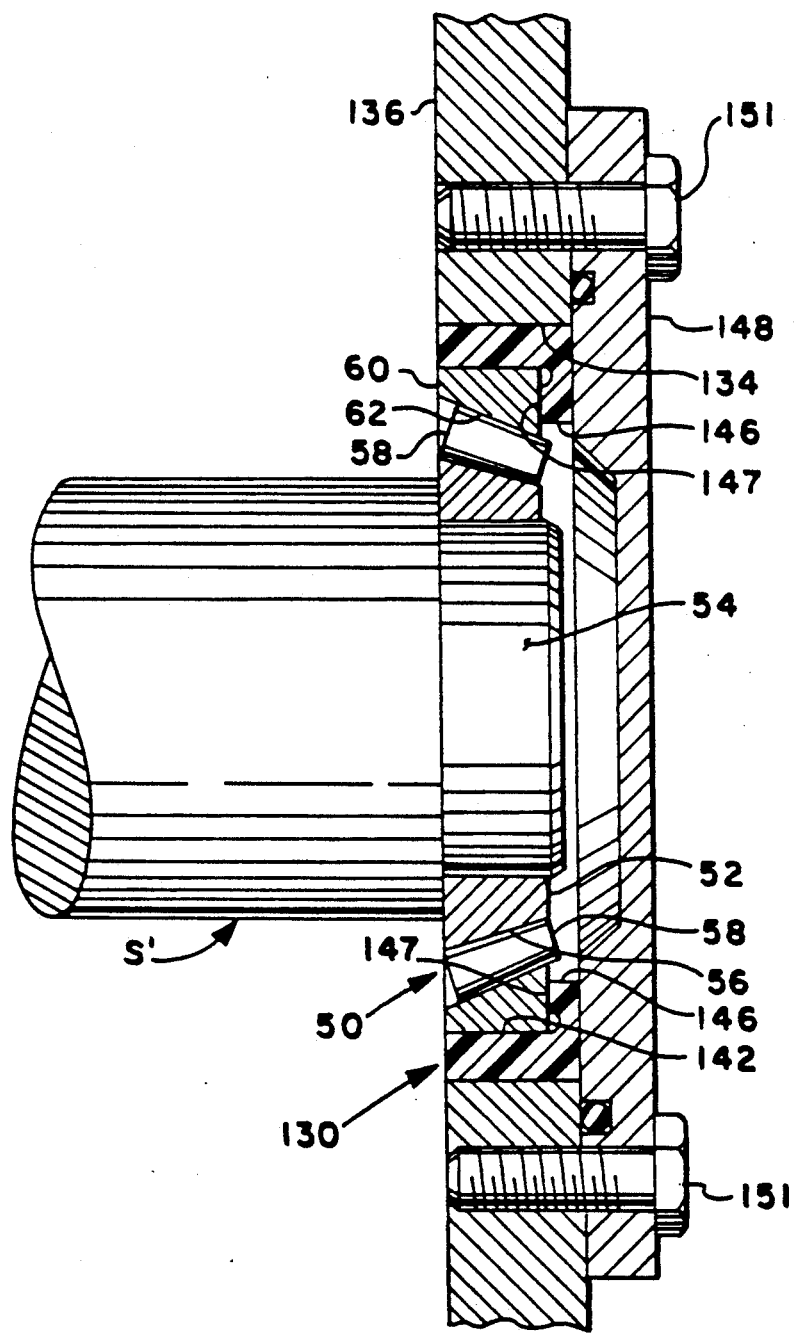

Referring to FIGS. 4 and 5 another embodiment of the invention is illustrated wherein a shaft S' is journalled in a tapered roller bearing, indicated generally at 50, having an annular inner race member 52 received on a reduced diameter portion 54 of shaft S'. The inner race 52 of bearing 50 has a conically tapered surface upon which plurality of rollers 58 are disposed circumferentially thereabout.

An outer annular race member 60 has a conically tapered inner surface 62 thereof also contacting the surface of rollers 58 to complete the journalling of shaft S'.

The outer race 60 of the bearing 50 is received in an annular bearing isolator, indicated generally at 130, which in the presently preferred practice may be formed of the same material as the isolator 30 in the FIG. 1 embodiment. Isolator 130 has energy absorbing means comprising a plurality of pads 142 circumferentially spaced about the inner periphery thereof with the radially inner surfaces of the pads 142 forming a diameter having at least a line-to-line interference fit with the outer diameter of the outer bearing race 60. The outer periphery of isolator 130 is received in closely fitting contact with the inner periphery 134 of an aperture formed in the housing 136.

With reference to FIG. 4, bearing isolator 130 also has stop means comprising a plurality of pads 144 disposed about the inner periphery thereof in circumferentially spaced arrangement and extending radially inwardly therefrom. In the presently preferred practice, the pads 144 are disposed circumferentially and each is intermediate adjacent ones of the energy absorbing pads 142, or in other words, the stop limit pads 144 alternate with the energy absorbing pads 142 in a circumferential direction.

In the currently preferred practice, the stop pads 144 have a greater circumferential extent than the energy absorbing pads 142 so as to have a substantially greater resistance to compression in a radial direction. It will be understood that the pads 144 have the radially inner surface thereof formed so as to be spaced radial outwardly from the outer race 60 by a suitable amount denoted Δr′ in FIG. 4, and which in this aspect is similar to the arrangement of the embodiment of FIG. 3. The energy absorbing pads 142 thus are permitted to be compressed in a radial outward direction by an amount Δr′ before the outer periphery of outer bearing race 60 contacts the surface of stop pads 144. In the presently preferred practice the distance Δr′ is of the order 0.005 inches (0.127 millimeters).

Referring to FIGS. 4 and 5, flange means extend radially inwardly from the axially outer edge of isolator 130. In the presently preferred practice the flange means comprises a plurality of tabs 146 disposed about the periphery of isolator 130 in circumferentially spaced arrangement and each is generally coincident with one of the stop pads 144. Each of the tabs 146 has an axially extending pad 147 provided thereon and which has registered against the outer axial face of outer bearing race 60. The isolator 130 is retained in housing 136 by a suitable rigid cover member 148 which has the inner surface thereof supporting the outer axial face of isolator 130 which includes the axial face of tabs 146 opposite the pads 147. Cover 148 is securely attached to the housing 136 by any suitable expedient as for example caps screws 151. It will be understood that the axial pads 147 are operative to absorb to a limited degree compression in the axial direction for dampening axial vibration and noise. In the present practice of the invention, the axial pads are sized and configured for a maximum compressive stress on the order of 3900 PSI ($2.7 \times 10^4$ KPa).

The present invention thus provides a unique and novel annular bearing isolator formed integrally of plastic material and having energy absorbing means in the form of a plurality of pads on the inner periphery thereof for absorbing radial vibration and deflection of the outer bearing race. The isolator also has stop means comprising a plurality of pads formed on the inner periphery for limiting the radial compression of the energy absorbing pads. The integral plastic bearing isolator of the present invention is also adaptable for tapered roller or thrust bearings by the addition of axial energy absorbing means comprising a plurality of tabs formed about the inner periphery, with each tab having an axially extending energy absorbing pad thereon.

The present invention thus provides a one piece annular plastic bearing isolator disposed between the outer bearing race and the inner periphery of the bearing mounting aperture in a housing in which it is intended to journal a rotating power transmission shaft.

Although the invention has hereinabove been described with respect to the illustrated embodiments, it will be understood that the invention is limited only by the scope of the following claims.

We claim:

1. A bearing isolator assembly for mounting a bearing of the type comprising an radially inner race, a radially outer race and a plurality of roller member to a housing having an aperture defining an inner diameter surface for receipt of said bearings, said outer bearing race defining an axially outwardly facing surface and an outer diameter surface, said bearing isolator assembly comprising:
   (a) integrally formed annular member formed of nonmetallic material disposed about said housing aperture inner diameter in closely fitting arrangement, said annular member having integrally formed thereon,
      (i) inner flange means extending radially inwardly and operable to limit axial movement of said outer race in at least one axial direction,
      (ii) a plurality of dampening pads disposed about the inner periphery of said member in circumferentially spaced arrangement, with the radially inner surface of said pads contacting the said outer race in at least line-to-line interference relationship; and,
      (iii) a plurality of stop means disposed about the inner periphery of said member in circumferentially spaced arrangement with the radially inner surface of each of said stop means spaced from the outer periphery of said outer race by a predetermined distance, wherein radial movement of said outer race with respect to said housing is absorbed by radial compression of said dampening pads and limited to said predetermined distance by contact with said stop means.

2. The assembly defined in claim 1, wherein said stop means are circumferentially spaced intermediate adjacent ones of said dampening pads.

3. The assembly defined in claim 1, wherein said dampening pads and said stop means are arranged in circumferentially alternating arrangement.

4. The assembly defined in claim 1, further comprising outer flange means extending radially outwardly from the outer periphery thereof said flange means defining an axial surface in registration against said housing.

5. The assembly defined in claim 1, wherein said inner flange means comprises a plurality of circumferentially spaced tabs extending from one axial edge of said member.

6. The assembly defined in claim 1, wherein said member is formed of plastic material having a compressive modulus in the range 200–1000 KPSI ($13.8-69 \times 10^5$ KPa).

7. The assembly defined in claim 1, wherein said member is formed of polyamide-imide material.

8. The isolator defined in claim 1, wherein said flange means includes a plurality of circumferentially spaced axially extending energy absorbing pads provided thereon, having predetermined compression rate in the axial direction.

9. The isolator defined in claim 1, wherein said flange means includes a plurality of circumferentially spaced energy absorbing pads extending there from a common axial direction, and configured to have a desired compressibility in an axial direction.

10. The isolator defined in claim 1, wherein said radially extending energy absorbing pads are disposed circumferentially intermediate said stop pads.

11. The isolator defined in claim 1, wherein said flange means includes a plurality of circumferentially spaced energy absorbing pads extending therefrom in a common axial direction and circumferentially coincident with said stop pads.

12. A noise isolator for mounting a bearing comprising: an annular member formed of non-metallic material and having integrally formed thereon, (a) a plurality of circumferentially spaced energy absorbing pads extending radially inwardly with each configured to have a desired compressibility in a radial direction and with the radially inner surface thereof defining a desired size periphery adapted for at least an interference fit with the outer periphery of a bearing race, (b) a plurality of circumferentially spaced stop pads extending radially inwardly each of said stop pads having the radially inner surface thereof radially indexed outwardly by a predetermined distance from the surface of the adjacent compression pads, (c) flange means extending radially inwardly from one axial end of said member and having an axial surface adapted for registration against a bearing mounting structure.

13. The isolator defined in claim 12, wherein said member is formed of material having a modulus of compression in the range of 200–1000 KPSI ($13.8-69 \times 10^5$ KPa) and a strength to modulus ratio of 0.05–0.2.

14. The isolator defined in claim 12, wherein said member is formed of polyamide-imide plastic material.

15. A bearing isolator for mounting a bearing to a support structure comprising: an annular member formed integrally of plastic material and having (i) first portions thereof defining radial compressible spring means about the inner periphery thereof, said spring means, upon mounting of said isolator over the outer race of said bearing and into said bearing support structure, operable to resiliently resist radial movement of said outer bearing race at a predetermined rate, (ii) second portions thereof defining stop means about the inner periphery thereof which, upon mounting of said isolator over the outer race of said bearing, are operative to limit said radial movement of said race on said spring means, and, (iii) third portions defining flange means extending outwardly as the outer periphery and having thereon certain surfaces adapted for registration against bearing mounting structure.

16. The isolator defined in claim 15, wherein said isolator is formed of polyamide-imide plastic material having a modulus in compression in the range 200–1000 KPSI ($13.8-69 \times 10^5$ KPa) and a strength to modulus ratio of 0.05–0.02.

17. The isolator defined in claim 15, wherein said first and second portions each comprise a plurality of circumferentially spaced pads.

18. The isolator defined in claim 15, wherein said first portions define a plurality of surfaces adapted for line-to-line interference both with the outer periphery of the bearing to be mounted on said support structure.

19. The isolator defined in claim 15, wherein said first portions include surfaces defining an inner circumference of a preselected diameter; and, said second portions include surfaces defining an inner circumference having a diameter preselected an incremental amount greater than said preselected diameter.

20. The isolator defined in claim 15, wherein said first portions comprise a plurality of circumferentially spaced pads with each pad sized and configured to have a radial spring rate in compression in the range one-half to two million pounds per inch ($0.5-2 \times 10^6$ lb/in) ($4.30-17.2 \times 10^5$ Kg/cm).

* * * * *